(12) United States Patent
Kamm et al.

(10) Patent No.: US 8,468,878 B2
(45) Date of Patent: Jun. 25, 2013

(54) METHOD AND ARRANGEMENT FOR FULLY AUTOMATIC FUNCTION CHECKING OF INTERNAL COMBUSTION ENGINES

(75) Inventors: Stefan Kamm, Murnau am Staffelsee (DE); Robert Tappe, Grossmehring (DE); Manuel Bestle, Laugna (DE); Mike Helmchen, Boehmfeld (DE)

(73) Assignee: Audi AG, Ingolstadt (DE)

( * ) Notice: Subject to any disclaimer, the term of this patent is extended or adjusted under 35 U.S.C. 154(b) by 165 days.

(21) Appl. No.: 12/667,613

(22) PCT Filed: Jun. 25, 2008

(86) PCT No.: PCT/EP2008/005114
§ 371 (c)(1),
(2), (4) Date: Sep. 9, 2010

(87) PCT Pub. No.: WO2009/003617
PCT Pub. Date: Jan. 8, 2009

(65) Prior Publication Data
US 2010/0326177 A1 Dec. 30, 2010

(30) Foreign Application Priority Data
Jul. 4, 2007 (DE) .......................... 10 2007 031 110

(51) Int. Cl.
*G01M 15/00* (2006.01)
(52) U.S. Cl.
USPC ..................................... 73/114.71; 73/116.01
(58) Field of Classification Search
USPC ................. 73/114.71, 116.01, 116.05, 116.06
See application file for complete search history.

(56) References Cited

U.S. PATENT DOCUMENTS

| | | | | |
|---|---|---|---|---|
| 3,302,107 A | * | 1/1967 | Flaugher et al. | 324/170 |
| 3,926,043 A | * | 12/1975 | Marshall et al. | 73/116.06 |
| 4,385,518 A | * | 5/1983 | Rickett | 73/118.01 |
| 4,831,868 A | * | 5/1989 | Makino | 73/114.61 |
| 5,193,062 A | * | 3/1993 | Murase et al. | 701/93 |
| 5,195,038 A | * | 3/1993 | Yagi et al. | 73/114.36 |
| 5,521,824 A | * | 5/1996 | Eagan et al. | 701/101 |
| 5,783,990 A | * | 7/1998 | Dambach | 340/438 |
| 6,662,637 B1 | * | 12/2003 | Nakanishi et al. | 73/114.15 |
| 6,785,605 B2 | * | 8/2004 | Huller et al. | 701/114 |
| 6,823,726 B1 | * | 11/2004 | Nagy | 73/114.75 |
| 7,039,541 B2 | * | 5/2006 | Grunbacher et al. | 702/113 |
| 2003/0182994 A1 | * | 10/2003 | Huller et al. | 73/118.1 |

FOREIGN PATENT DOCUMENTS

| | | |
|---|---|---|
| DE | 40 04 299 A1 | 8/1994 |
| DE | 4428818 A1 | 2/1996 |
| DE | 19607461 A1 | 9/1997 |
| DE | 102004045250 A1 * | 3/2006 |
| DE | 43 02 482 B4 | 4/2006 |
| WO | WO 02/14828 A | 2/2002 |

\* cited by examiner

*Primary Examiner* — Freddie Kirkland, III
(74) *Attorney, Agent, or Firm* — Novak Druce Connolly Bove + Quigg LLP

(57) ABSTRACT

The invention relates to a method or an arrangement for function checking of internal combustion engines in motor vehicles, in which an external testing and measuring system is connected via a diagnostic interface to an on-board diagnostic and control system, and after the start of the testing process, the testing system triggers control signals to adjust the defined operating conditions of the internal combustion engine, and performs and documents analyses. To ensure an automatic testing process, it is proposed to launch a safety routine in the diagnostic and control system that interrupts the automatic testing process when certain signals are present from on-board control and/or operating devices.

6 Claims, 2 Drawing Sheets

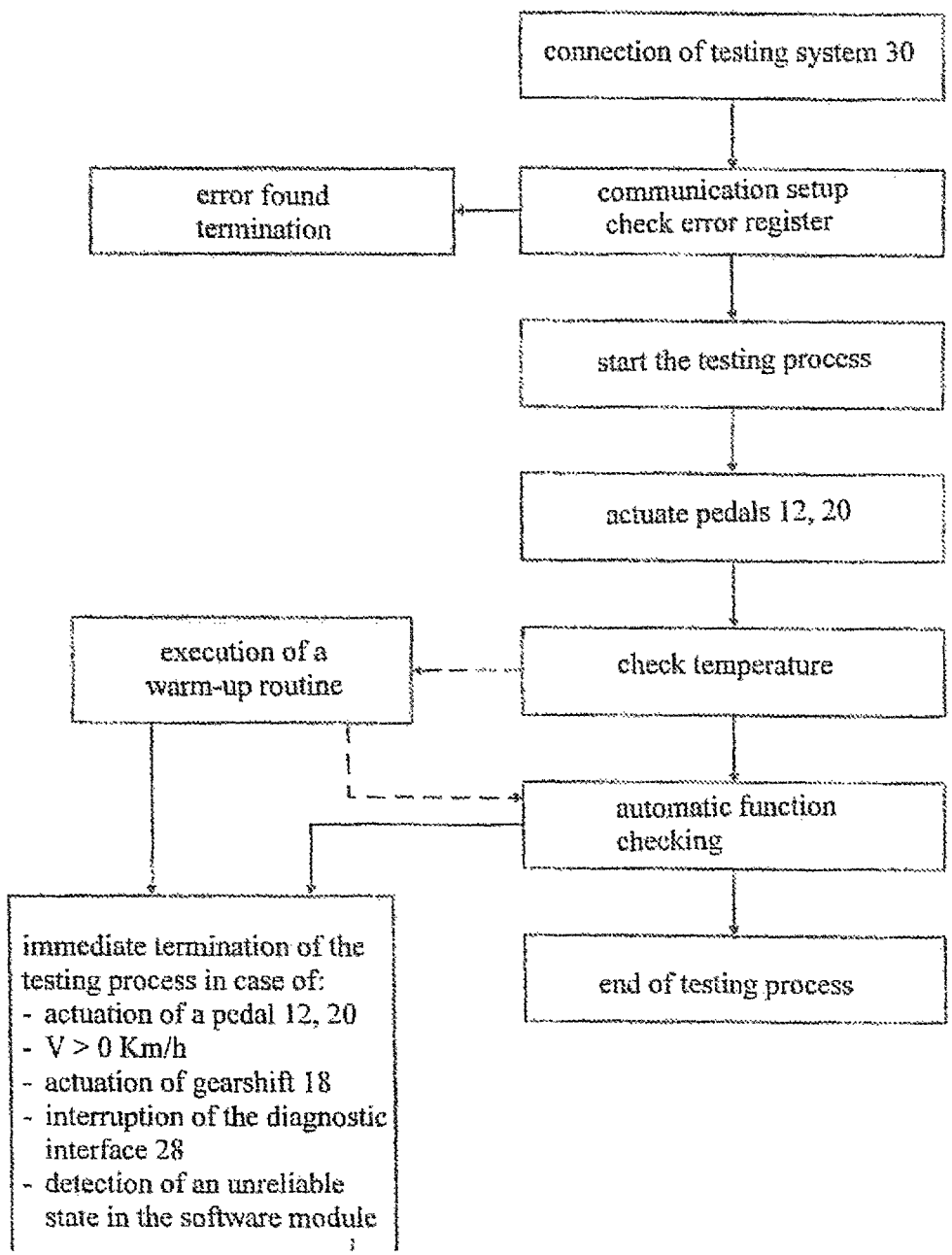

METHOD AND ARRANGEMENT FOR FULLY AUTOMATIC FUNCTION CHECKING OF INTERNAL COMBUSTION ENGINES

The invention relates to a method and an arrangement for function checking of internal combustion engines in motor vehicles.

BACKGROUND OF THE INVENTION

DE 100 39 965 A1 describes such a method, in which an external testing and measuring system is connected via a diagnostic interface to an on-board diagnostic and control system (OBD), and after the start of the testing process, the testing system triggers control signals to adjust the defined operating conditions of the internal combustion engine, and performs and documents analyses. This testing process which is used in particular in the production of new motor vehicles is automated to the greatest possible extent, a defined warm-up of the internal combustion engine and defined engine speed for checking, e.g., exhaust gas values and functional parts being controlled and adjusted via the diagnostic and control system (engine control unit).

The above-described testing process is carried out in compliance with necessary safety requirements. Compliance with the safety requirements is monitored by an employee within the framework of a so-called "operator-bound" engine check.

SUMMARY OF THE INVENTION

This object is achieved, according to the invention, with the features of claim 1. Further advantageous developments of the method are contained in the additional claims.

According to the invention, it is proposed to launch a safety routine in the diagnostic and control system that interrupts the testing process when certain signals are present from on-board control and/or operating devices. This is to ensure that unintentional manual interventions in the automated testing process, but especially operating errors, are precluded. As a result, an "operator-free" engine test is achieved in which compliance with the safety requirements can be carried out in an automated fashion without the need for and employee to be present.

Preferably the diagnostic and control system thereby can shut off the internal combustion engine when the testing process is interrupted in order to preclude potential impending follow-on damage.

In one monitoring step, the condition at least of one of the operating pedals of the motor vehicle can be detected, and the testing process can be terminated with the actuation of said pedal. The pedals can be in particular the gas pedal, optionally the clutch pedal, and/or the brake pedal of the motor vehicle. By preference, the actuation of any of the operating pedals can be detected. As an alternative or in addition, the actuation of the gear shift lever can also be detected.

Furthermore, the operating position of the speed change transmission can be detected, and the testing process can be terminated when a gear is selected. In an automatic speed change transmission with an electronic transmission control system, the diagnostic and control system advantageously can communicate with the transmission control system.

In addition, the diagnostic and control system can terminate the testing process when the speed V of the motor vehicle is greater than 0. This also ensures that no unintentional, irregular driving condition can occur during the automatically controlled test process.

The diagnostic and control system can thereby detect signals from wheel speed sensors of the motor vehicle and can terminate the testing process when a wheel speed of >0 is detected.

If the motor vehicle is equipped with an electronic stability control system and/or an anti-lock brake system, the diagnostic and control system advantageously can communicate with the control device of the electronic stability control system and thereby detect the speed V or the wheel speed.

Finally, in a further configuration of the invention, the testing process which is controlled via the testing system can be terminated when the communication with the on-board diagnostic and control system is interrupted.

To achieve a fully automatic, so-called "operator-free" check, both a pedal and gear shift lever actuation as well as the above-indicated speed signal can be detected by means of the safety routine, and the communication between the testing system and the diagnostic and control system can be monitored. In the case of a pedal or gear shift lever actuation, a speed signal and/or a communication error, the automatic testing process is immediately terminated.

BRIEF DESCRIPTION OF THE DRAWINGS

FIG. 2 shows the process steps for performing the testing process of the function checking.

DETAILED DESCRIPTION OF THE PREFERRED EMBODIMENTS OF THE INVENTION

Figure 1:
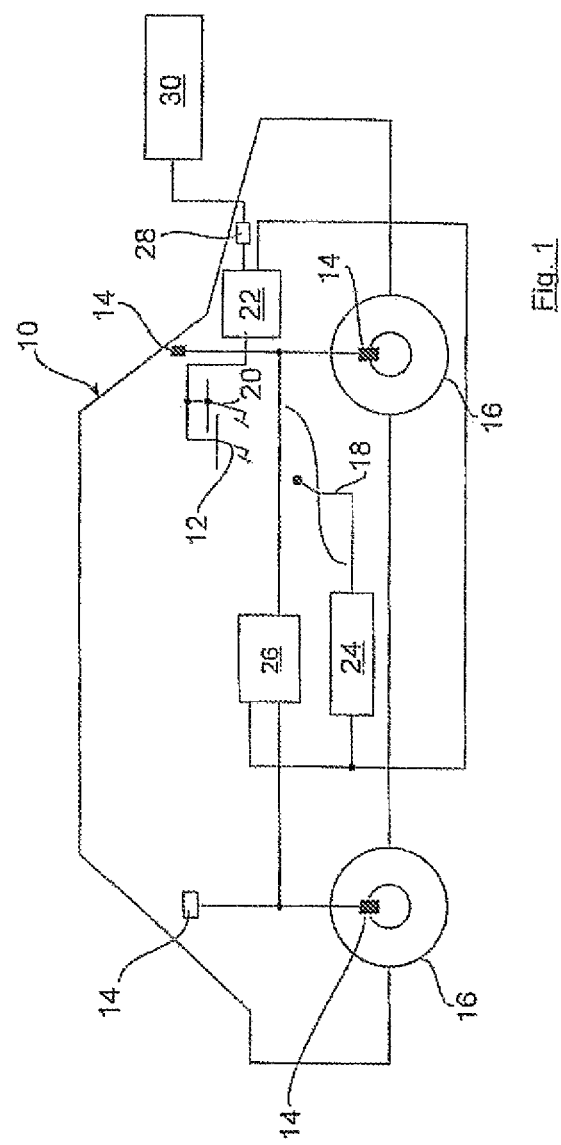
FIG. 1 as a block diagram, shows a motor vehicle with an on-board diagnostic and control system, which is connected via a diagnostic interface to an external testing and measuring system for performing function checking.

The motor vehicle 10, if not described, is of conventional design, with an internal combustion engine, which is not shown, and an automatic or manual speed change transmission, a hydraulic brake system, including a brake pedal 12 and wheel speed sensors 14 on the wheels 16, as well as a gearshift 18 for operating the transmission. In addition, a gas pedal 20 is provided for at-will control of the internal combustion engine.

The motor vehicle 10 has an electronic diagnostic and control system with a control device 22, which is connected to a number of sensors (not shown), such as a temperature transmitter, lambda probe, speed sensor, etc., and controls actuators such as an injection control, throttle valve actuators, etc., of the internal combustion engine as required.

The control device 22 is also connected via pertinent signal lines (without reference numbers) with signal transmitters on the brake pedal 12 and on the gas pedal 20.

In addition, the control device 22 optionally communicates with an electronic control device 24 of the automatic transmission and thus receives control signals on its switching status or on the position of the gearshift 18 as well as with an electronic control device 26 of the electronic stability control system of the motor vehicle (e.g., ESP™) and processes the control signals of the related wheel speed sensors 14, 16 for determining the speed V of the motor vehicle.

The control device 22 of the diagnostic and control system of the motor vehicle is connected via a diagnostic interface 28 to an external testing and measuring system 30, by means of which, after the motor vehicle is manufactured, a testing process or function checking of the internal combustion engine can be controlled, analyzed and documented. The testing and measuring system has, e.g., an exhaust gas tester, by means of which exhaust gas values of the internal combustion engine can be collected with defined, specified load and speed values.

To this end, a software module is integrated into the software of the control device 22, and said module runs subsequent to a defined starting request via the diagnostic function of the control device 22. The software module causes the control device 22 to supply fuel independently to increase speed. The latter is used first for conditioning (warming up) the internal combustion engine and then for running speed-dependent and output-dependent diagnostics (e.g., swirl flap actuator in the intake manifold, lambda probe check, etc.). In addition, the software module controls the automatic polling and running of individual engine diagnostics.

By the implementation of a safety routine in the control device 22, which is fed by information from the communicating control devices 24, 26 and the signal transmitters to the operating pedals 12, 20, the automatic testing process is ensured according to the flow chart below (cf. FIG. 2):

First, the testing system 30 is connected via the diagnostic interface 28 to the on-board diagnostic- and control system or the control device 22 and thus communication is initiated. As part of this, an error register of the control device 22 is read out; if an error is diagnosed, the testing process is not started or is terminated.

If no error is detected in the sensors and actuators of the control system, the testing process is started as the next step, at the beginning, the operator being required via the testing system 30 to actuate the pedals 12, 20. In addition, a temperature check of the internal combustion engine is carried out. If this does not correspond to the preset operating temperature, then first a warm-up routine is controlled with, among other things, a corresponding increase in speed.

If the temperature of the internal combustion engine that is specified for the testing process is reached or is present, the automatic testing process or the function checking of the internal combustion engine is initiated and executed with control signals specified via the testing system 30 and with speed and load profiles automatically implemented via the control device 22.

The automatic testing process or, where indicated, the warm-up routine, however, is terminated immediately by way of the safety routine that is integrated into the control device 22, and shutting-off of the internal combustion engine is controlled if at least one of the conditions below exists:

If it is detected, via the wheel speed sensors 14 and the control device 26, that the speed V is >0 Kmh, or the motor vehicle is not shut down;

if the brake pedal 12 and/or the gas pedal 20 is actuated;

if the gearshift 18 of the automatic gear is taken out of its neutral position or park position; or if communication of the testing system 30 with the control device 22 is interrupted; or if an unreliable state in the software module of the operator-free engine check is detected.

If none of the above-mentioned conditions that impair the reliability of the automatic testing process exists, the testing system 30 is separated again from the diagnostic interface 28 after completion of the regular testing process. The analyses of the testing system 30 are documented with the vehicle data.

In addition to the above-mentioned operating pedals 12, 20, e.g., in the case of a control gear, the actuation of a clutch pedal can be monitored analogously.

The invention claimed is:

1. A method for function checking of internal combustion engines in motor vehicles, in which an external testing and measuring system is connected via a diagnostic interface to an onboard diagnostic and control system, and after the start of a testing process, the testing system triggers control signals to adjust defined operating conditions of the internal combustion engine, and performs and documents analyses, wherein a safety routine is launched in the diagnostic and control system that interrupts the automatic testing process when certain signals are present from on-board control and/or operating devices, and wherein when the safety routine interrupts the automatic testing process, the internal combustion engine is shut down, wherein the state of at least one operating pedal is detected, wherein the testing process is terminated if the at least one operating pedal is actuated, wherein the state of a gear shift lever is detected, wherein the testing process is terminated if the gear shift lever is actuated, wherein an operating position of a speed change transmission is detected, wherein the testing process is terminated if the operating position of the speed change transmission indicates that a gear is selected, wherein in an automatic transmission with an electronic transmission control system, the diagnostic and control system communicates with the electronic transmission control system, wherein the diagnostic and control system terminates the testing process when a speed V of the motor vehicle is greater than 0, wherein the diagnostic and control system detects signals from wheel speed sensors of the motor vehicle and wherein checking is terminated when a wheel speed of >0 is detected.

2. The method according to claim 1 wherein the motor vehicle is provided with an electronic stability control system and wherein the diagnostic and control system communicates with the control device of the electronic stability control system.

3. The method according to claim 1 wherein the testing process is terminated when communication of the on-board diagnostic and control system with the testing system is terminated.

4. The method of claim 1 wherein the diagnosis of said engine includes an analysis of a composition of an exhaust gas thereof under selected operating conditions of said engine.

5. The method of claim 4 including:

sensing a temperature of said engine;

comparing the sensed temperature with a selected temperature; and delaying said analysis pending attainment of said selected temperature of said engine.

6. The method of claim 1 including terminating said diagnosis upon detection of a predetermined unreliable state of a software module of diagnostic means of said vehicle.

\* \* \* \* \*

UNITED STATES PATENT AND TRADEMARK OFFICE
CERTIFICATE OF CORRECTION

PATENT NO. : 8,468,878 B2
APPLICATION NO. : 12/667613
DATED : June 25, 2013
INVENTOR(S) : Kamm et al.

Page 1 of 1

It is certified that error appears in the above-identified patent and that said Letters Patent is hereby corrected as shown below:

In the Claims

Column 4, Claim 1, Line 12 should read – "...control ~~and/for~~ and/or operating devices, and..."

Signed and Sealed this
Twenty-second Day of April, 2014

Michelle K. Lee
*Deputy Director of the United States Patent and Trademark Office*